(12) United States Patent
Yoshinaga

(10) Patent No.: US 6,333,801 B1
(45) Date of Patent: Dec. 25, 2001

(54) ELECTRONIC EQUIPMENT FOR OPTICAL COMMUNICATION CAPABLE OF SAVING POWER

(75) Inventor: Yasuhiro Yoshinaga, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/207,199

(22) Filed: Dec. 8, 1998

(30) Foreign Application Priority Data

Dec. 15, 1997 (JP) .................................................. 9-343527

(51) Int. Cl.⁷ .................................................. H04B 10/00
(52) U.S. Cl. .............................................. 359/152; 359/154
(58) Field of Search .................................. 359/152, 154, 359/189

(56) References Cited

U.S. PATENT DOCUMENTS 5,262,885 * 11/1993 Steers et al. ........................... 359/152
5,519,389 * 5/1996 DeGunther et al. ............. 340/870.29
5,852,506 * 12/1998 Testani et al. ........................ 359/155

FOREIGN PATENT DOCUMENTS

A5-193427    8/1993 (JP).

* cited by examiner

Primary Examiner—Jason Chan
Assistant Examiner—Christina Y Leung
(74) Attorney, Agent, or Firm—Nixon & Vanderhye P.C.

(57) ABSTRACT

An electronic equipment has a transmission/reception circuit for optical communication, and a CPU which is operated by programs and can be switched to either an operation mode or a standby mode involving less power consumption than the operation mode. The electronic equipment includes measuring instrument for, in the standby mode of the CPU, measuring frequency of light inputted from the transmission/reception circuit by using a clock which is operating in the standby mode, and frequency discriminating instrument for discriminating whether or not the measured frequency is a desired frequency. The CPU is changed from the standby mode to the operation mode depending on a discrimination result of the frequency discriminating instrument, and optical communication is executed by the transmission/reception circuit. Thereby, standby cancellation with an optical input is enabled with low power consumption maintained, by which the load on the CPU is reduced.

2 Claims, 5 Drawing Sheets

ELECTRONIC EQUIPMENT FOR OPTICAL COMMUNICATION CAPABLE OF SAVING POWER

BACKGROUND OF THE INVENTION

The present invention relates to electronic equipment having optical communication function and a CPU which can take a standby mode and, more particularly, to such electronic equipment using batteries or the like.

Conventionally, as seen in Japanese Patent Laid-Open Publication HEI 5-193427, in electronic equipment having a standby mode function and enabled to execute optical communication, the power for the optical communication part is kept interrupted in the standby mode so that the power consumption of the equipment is lowered.

In this prior art, there have been issues including:

1) In the standby mode of the equipment, because the power for the optical communication part is kept interrupted, the cancellation of the standby mode with an optical signal is impossible; and 2) Although the above issue can be solved by not interrupting the power for the optical communication part, a) power consumption of the optical communication part increases. b) Because optical communication is not enabled unless the standby mode is canceled, it cannot be discriminated whether input light is noise or a signal. As a result, the standby mode would be canceled even with optical noise such as extraneous light, causing the power consumption to increase.

Therefore, an object of the present invention is to provide a circuit which can execute optical communication by implementing the standby cancellation with an optical signal when necessary and correctly, without increasing the power consumption (without the standby mode being unnecessarily canceled by extraneous optical noise).

In order to achieve the above object, there is provided Electronic equipment having a transmission/reception circuit for optical communication, and a CPU which is operated by programs and can be switched to either an operation mode or a standby mode involving less power consumption than the operation mode, the electronic equipment comprising: measuring instrument for, in the standby mode of the CPU, measuring frequency of light inputted from the transmission/reception circuit by using a clock which is operating in the standby mode, and frequency discriminating instrument for discriminating whether or not the measured frequency is a desired frequency, wherein the CPU is changed from the standby mode to the operation mode depending on a discrimination result of the frequency discriminating instrument, and optical communication is executed by the transmission/reception circuit.

According to the above construction, in electronic equipment having a standby function and optical communication, the power for the optical communication part is turned ON/OFF by referencing the sub-clock in the standby mode. Then, over the measurement of an inputted optical signal, when the optical signal is a desired frequency, the standby mode is canceled so that the optical communication is enabled. As a result, there are produced advantages that:

Even in the standby mode of the electronic equipment on the reception side, optical communication is enabled by canceling the standby mode with an optical input by using the sub-clock; and Because this advantageous result is enabled without increasing the power consumption, service life of the battery such as cells can be prolonged.

In an embodiment of the present invention, a reception side has a signal feedback circuit for, based on a discrimination result of the frequency discriminating instrument, feeding back the discrimination result to a transmission side, and the transmission side outputs a signal with a frequency different from the frequency of the received signal, and this sequence is iterated a plurality of times.

According to the above construction, in electronic equipment having a standby function and optical communication, the power for the optical communication part is turned ON/OFF by referencing the sub-clock in the standby mode. Then, over the measurement of an input optical signal, when the signal is a desired frequency, the discrimination result is fed back to the transmission side, so that the frequency of the optical signal from the transmission side is changed, and similar sequence is iterated.

By this operation, it is discriminated whether the optical input is extraneous noise or a desired signal. After the discrimination, the standby mode is canceled. As a result, there are produced advantages that:

In the standby mode of the electronic equipment on the reception side, it can be discriminated whether the received input is optical noise such as extraneous light or a signal. Therefore, the standby mode can be canceled only with an optical input, so that unnecessary standby cancellations can be eliminated; and Because this advantage is accomplished without using the main clock, there is no need of complex operations (programs) of the CPU so that the load on the CPU is reduced.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
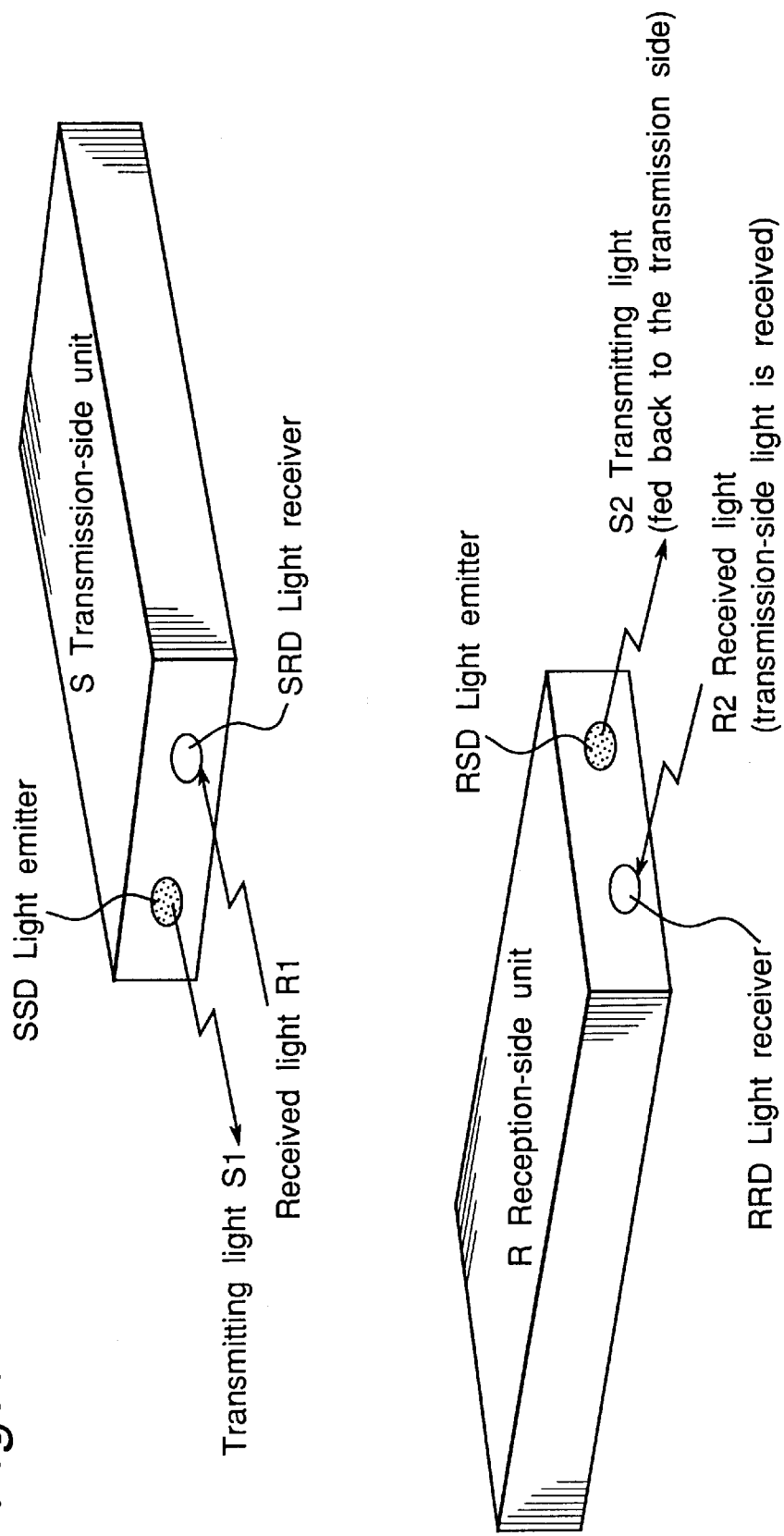
FIG. 1 is an appearance view of the present invention.

Hereinbelow, embodiments of the present invention are described with reference to the accompanying drawings. FIG. 1 gives an appearance perspective view of the present invention. This figure consists of a transmission-side unit S and a reception-side unit R, the equipment comprising a light emitter SSD and a light receiver SRD on the transmission side, and a light emitter RSD and a light receiver RRD on the reception side, as main components.

Transmitting light S1 from the light emitter SSD on the transmission side is received by the light receiver RRD as received light R2 on the reception side.

Also, as feedback from the reception side to the transmission side, transmitting light S2 emitted from the light emitter RSD on the reception side is received by the light receiver SRD as received light R1 on the transmission side.

First Embodiment

Figure 2:
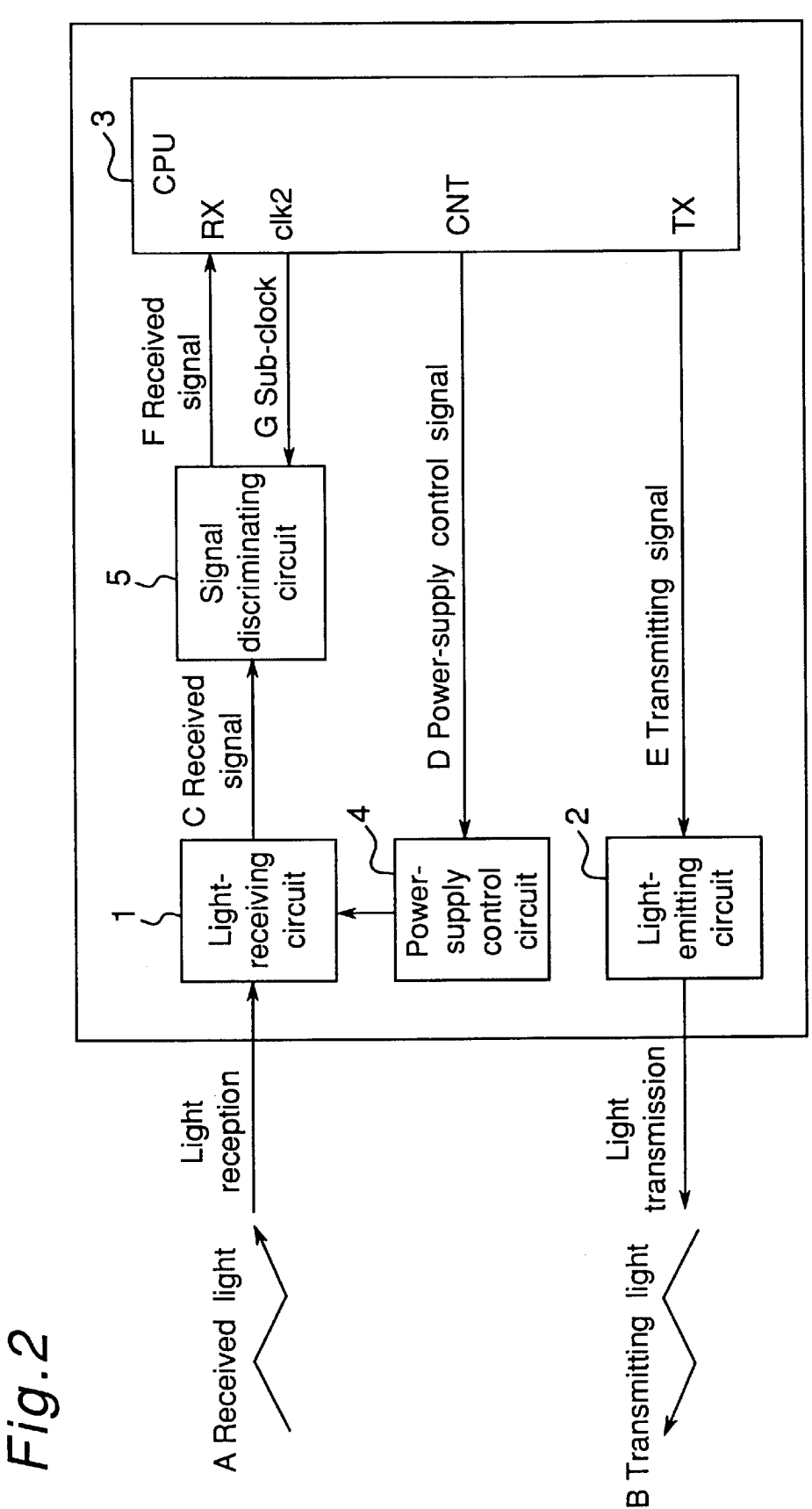
FIG. 2 is a block diagram showing a first embodiment of the present invention.

FIG. 2 is a configuration example of electronic equipment having an optical communication function according to a first embodiment of the invention.

The electronic equipment having an optical communication function of this figure comprises, as main components, a light-receiving circuit 1, a light-emitting circuit 2, a CPU 3, a power-supply control circuit 4 and a signal discriminating circuit 5.

The light-receiving circuit 1 comprises a photodiode, an amplifier, a transistor or the like, and its output is connected to the signal discriminating circuit 5.

The signal discriminating circuit 5 comprises a counter implemented by, for example, a flip-flop, and discriminates whether or not the frequency of an input optical signal is a preset frequency, by referencing a sub-clock from the CPU.

A resultant signal after the discrimination is outputted to a terminal RX of the CPU 3, by which the received signal is inputted to the CPU 3.

The light-emitting circuit 2 comprises a light-emitting diode and a transistor, and its input is connected to a terminal TX of the CPU 3. The light-emitting circuit 2, fed with a transmitting signal from the CPU 3, performs light emission according to the transmitting signal from the CPU 3.

To the power-supply control circuit 4, a power-supply control signal is inputted from the CPU 3, by which the power supply for the light-receiving circuit 1 can be interrupted.

The power-supply control circuit 4 comprises, for example, a transistor, and power control is implemented by the transistor turning ON/OFF.

Figure 4:
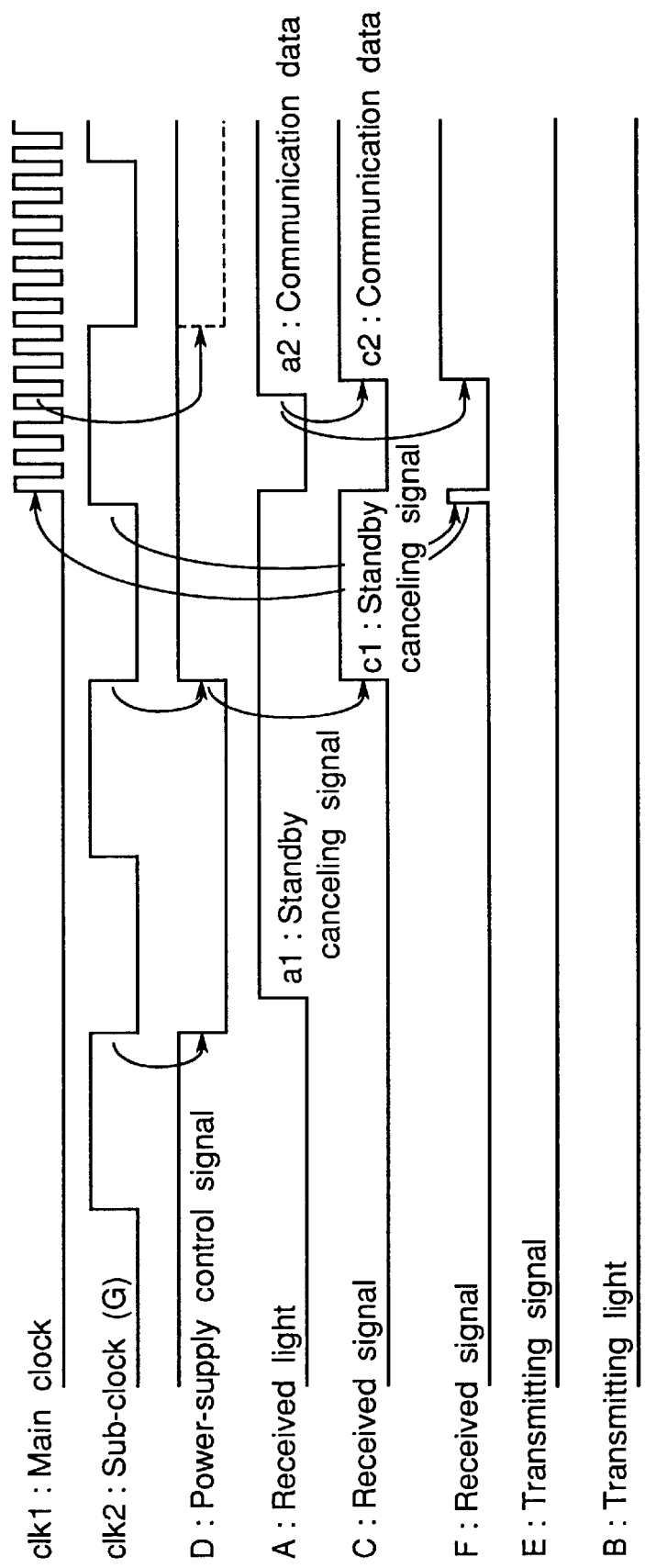
FIG. 4 is a timing chart showing the first embodiment of the present invention.

In addition, a timing chart of signals used on the circuit structure of FIG. 2 is presented as FIG. 4.

In FIG. 4, reference characters designate received light by A, transmitting light by B, a received signal by C, a transmitting signal by E and a received signal after the signal discrimination by F.

Also, the power-supply control signal for the light receiver is designated by D. In order to show how the standby state of the CPU is changed by these signals, a main clock clk1, which is a high-speed clock for the CPU, and a sub-clock clk2, which is a low-speed clock, are charted.

In this case, while the CPU is in the standby mode, the main clock clk1 keeps halted, where only the sub-clock clk2 is operating.

Also, when the CPU, after cancellation of the standby mode, actually starts optical communication, both clk1 and clk2 are operating.

At the beginning of the timing chart of FIG. 4, the CPU 3 of FIG. 2 is in the standby mode.

At that time, the CPU 3 is outputting a power-supply control signal D that is a signal resulting from frequency-dividing by two the sub-clock clk2 by an unshown frequency divider.

In this state, when the received light A is inputted to the light-receiving circuit 1, subsequent operation differs depending on the state of the power-supply control signal D.

With D "inactive" (Low state in FIG. 4), even if this received light A is inputted, the signal is not transferred to the succeeding-stage signal discriminating circuit 5, nor is the standby mode canceled.

With D "active" (High state in FIG. 4), when the received light A is inputted, the signal is transferred to the succeeding-stage signal discriminating circuit 5.

In FIG. 4, when the received light A is inputted, the signal D is "inactive", with no operations going.

When the signal D goes "active", the received signal C goes operative so that the received signal is inputted to the signal discriminating circuit 5. It is noted that a signal (c1) of C is the same as a signal (a1) of the received light A.

The signal discriminating circuit 5 makes an internal counter operate at an inputted frequency c1, determines the count value by referencing the sub-clock G, and measures the frequency of the c1 input.

In this case, if the count value is not a desired value, the signal (received signal F in FIG. 4) is not transferred to the succeeding-stage CPU, so that the CPU 3 holds the standby mode.

In FIG. 4, assuming that the frequency is the desired value, the received signal F is operated.

As a result of this, the standby mode of the CPU 3 is canceled (the main clock is operated).

After the cancellation of the standby mode, a CNT signal of the CPU 3 itself (i.e., the power-supply control signal D) is always set to the "active" state, where light reception is normally enabled.

After that, actual optical communication is started.

In the case of FIG. 4, the a2 signal of the received light A is communication data. This data passes, in FIG. 2, through the light-receiving circuit 1 and the signal discriminating circuit 5, becoming the received signal C and the received signal F, thus being connected to the CPU 3 as an RX signal, where the communication is started.

Second Embodiment

Figure 3:
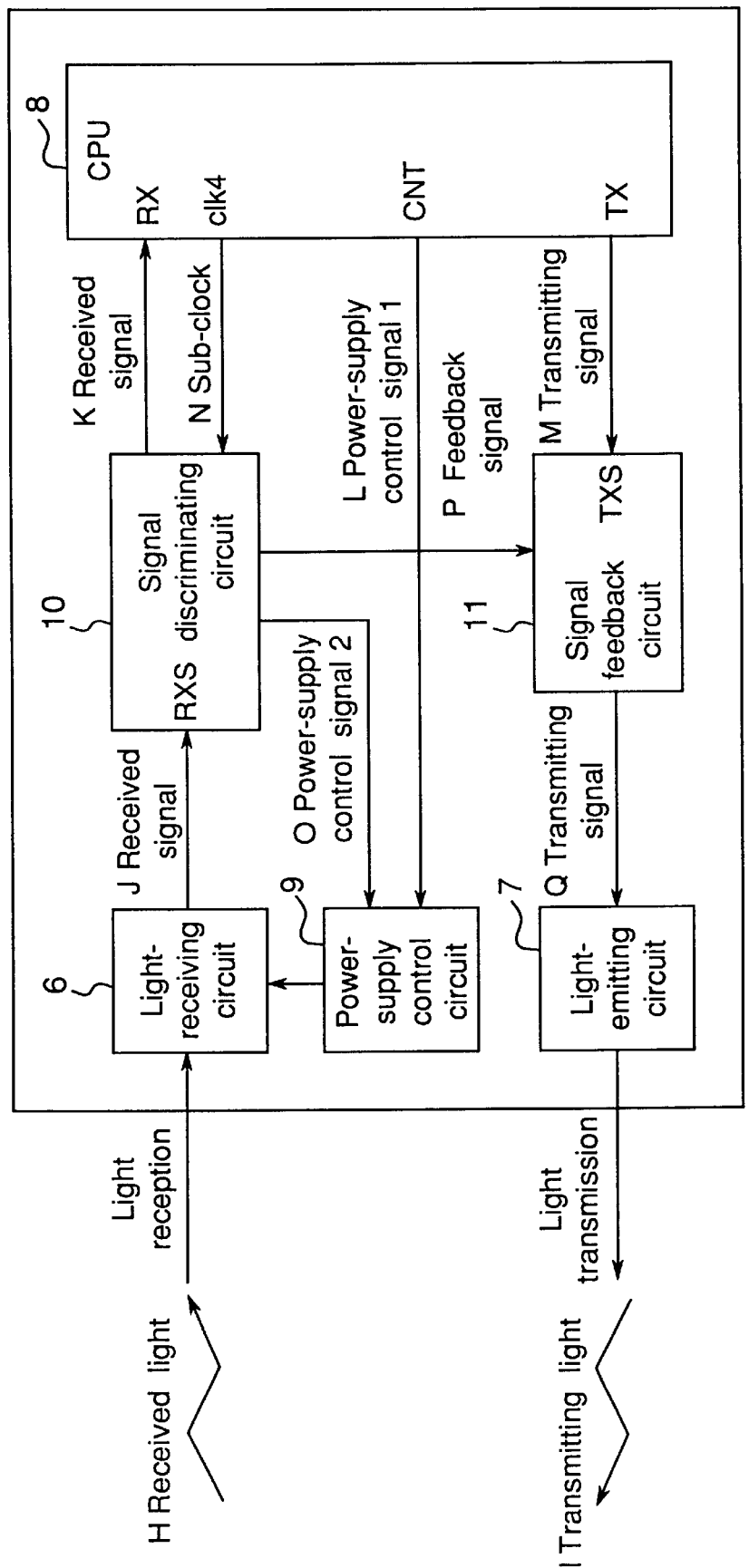
FIG. 3 is a block diagram showing a second embodiment of the present invention.

FIG. 3 shows a configuration example of an electronic circuit system according to a second embodiment of the invention. The electronic circuit system comprises, as main components, a light-receiving circuit 6, a light-emitting circuit 7, a CPU 8, a power-supply control circuit 9, a signal discriminating circuit 10 and a signal feedback circuit 11.

The light-receiving circuit 6 is of the same structure as the light-receiving circuit 1. Its output is connected to a terminal RXS of the signal discriminating circuit 10, and a received signal is inputted to the signal discriminating circuit 10.

The signal discriminating circuit 10, although similar in structure to the signal discriminating circuit 5, additionally has a function of once connecting a discriminated signal to the signal feedback circuit 11, and an output for uniquely implementing power supply control for the light-receiving circuit.

In order to discriminate over several cycles on the sub-clock basis whether the signal from the light-receiving circuit 6 is extraneous light (noise) or a signal from the transmission side, a received signal K will not be connected to the CPU until it is finally discriminated that the signal is a transmitting signal.

Then, if it is finally discriminated that the optical input is a received signal, the received signal K is transferred to the CPU 8.

In the state of halfway the discrimination, a power-supply control signal 2(O) is outputted to maintain the light receiver always "active", and the received signal is connected to the signal feedback circuit 11, by which the signal that is being received is fed back to the transmission side.

The signal feedback circuit 11 is a switch that functions, in the standby mode, to connect a signal from the signal discriminating circuit 10 to the light-emitting circuit 7 and, in the operation mode, to connect a terminal TXS signal of the CPU 8 to the light-emitting circuit 7.

The light-emitting circuit 7 is of the same structure as the light-emitting circuit 2.

The power-supply control circuit 9 is also of the same structure as the power-supply control circuit 4, controlling the power supply for the light-receiving circuit 6.

However, the power-supply control signal is connected in two from the CPU 8 and the signal discriminating circuit 10.

The signal discriminating circuit 10, although equivalent in structure to the signal discriminating circuit 5, has a feedback signal P connected to the signal feedback circuit to feed back a signal to the transmission side, and also outputs a unique power-supply control signal.

The signal discrimination is executed as the CPU 8 is kept in the standby mode.

Further, the signal discriminating circuit 10 has a plurality of desired count values, and has a structure that the counter can be freely set so that whether or not a desired value is set can be discriminated for a plurality of frequencies.

After the discrimination that the signal is a desired frequency, the signal discriminating circuit 10 transfers the received signal to the CPU 8, canceling the standby mode, where normal optical communication is executed.

Figure 5:
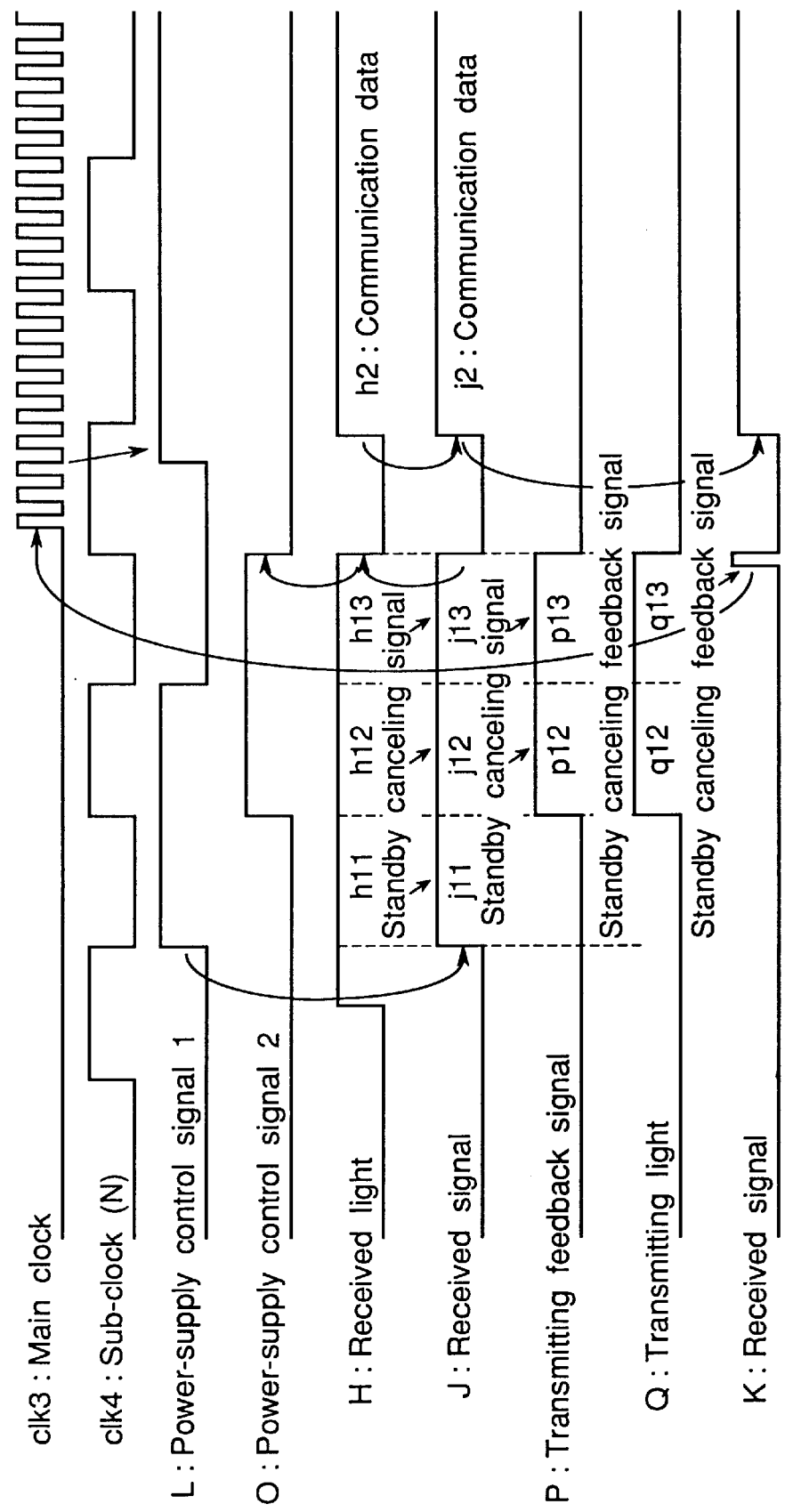
FIG. 5 is a timing chart showing the second embodiment of the present invention.

In addition, a timing chart of signals used on this circuit structure is presented as FIG. 5.

In FIG. 5, reference characters designate received light by H, transmitting light by I, a received signal by J, and a transmitting signal by Q.

Also, power-supply control signals for the light receiver are designated by L, O, and a signal fed back from the reception side to the transmission side is designated by P.

Also, a received signal from the signal discriminating circuit to the CPU (a received signal after the final discrimination of being an optical signal) is designated by K, and a transmitting signal from the CPU is designated by M.

Further, in order to show how the standby state of the CPU is changed by these signals, a main clock clk3 and a sub-clock clk4 of the CPU are shown.

In this case, while the CPU is in the standby mode, the main clock clk3 keeps halted while only the sub-clock clk4 is operating.

Also, when the CPU, after cancellation of the standby mode, actually starts optical communication, both clk3 and clk4 are operating.

In FIG. 5, the operation to be executed until the received light H is inputted to the light-receiving circuit so that the power-supply control signal L goes "active" is equivalent to the operation described in FIG. 4.

After that, with the received signal J inputted to the signal discriminating circuit 10, if it is discriminated by half the sub-clock N that the signal is a desired frequency, then the power-supply control signal 2(O) is made "active" so that signal reception is always enabled, where the transmission feedback signal P is connected to the signal feedback circuit 11.

This signal P is a signal for feeding back the received frequency signal, as it is, to the transmission side, where h11 and p12 are signals of the same frequency at the time of start of the feedback.

The signal feedback circuit 11 outputs the feedback signal P as a transmitting signal Q.

The transmission side, receiving transmitting light I outputted as an optical signal into which the signal Q comes, changes the frequency of its transmitting signal.

Received light H is inputted as an h12 signal of this changed frequency. At this time point, the frequency p12 of the feedback signal P becomes the same as the h12.

After that, the signal discriminating circuit 10 counts the h12 signal at the half-clock time of the sub-clock N, thereby verifying that the signal is of a desired frequency. Then, the feedback signal p12 is changed to a signal p13 having a frequency resulting from frequency-dividing by two the received signal J as an example.

As a result, a q13 signal of the transmitting signal Q becomes the same frequency signal as the p13. When this fed-back optical signal I13 is returned to the transmission side, the transmission side outputs the signal with its frequency further changed.

The received light H is inputted as h13 of the changed frequency. Such a sequence is iterated a plurality of times, by which it is correctly discriminated whether the received light is an optical signal or noise such as extraneous light. If it is an optical signal, received signal K in FIG. 3 is outputted to the CPU 8 so that the standby mode of the CPU is canceled.

After that, the power-supply control signal 1(L) is changed "active", by which a normally communicatable state is set. Then, an h2 signal, which is actual communication data, is received.

At any time point, if it is discriminated that the inputted optical signal is not a desired frequency, the received signal K is not outputted to the CPU 8, and the reception side equipment holds the standby mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Electronic equipment having a transmission/reception circuit for optical communication, and a CPU which is operated by programs and can be switched to either an operation mode or a standby mode involving less power consumption than the operation mode, the electronic equipment comprising:

a first clock which is halted during the stand-by mode and a second clock which is operational during both the stand-by mode and the operation mode;

a measuring instrument for, in the standby mode of the CPU, measuring frequency of light inputted from the transmission/reception circuit, wherein power control for a light reception circuit is turned ON and OFF during the stand-by mode using the second clock;

a frequency discriminating instrument for discriminating whether or not the measured frequency is a desired frequency; and wherein the CPU is changed from the standby mode to the operation mode and the first clock is turned ON depending on a discrimination result of the frequency discriminating instrument, and optical communication is executed by the transmission/reception circuit.

2. The electronic equipment according to claim 1, wherein a reception side has a signal feedback circuit for, based on a discrimination result of the frequency discriminating instrument, feeding back the discrimination result to a transmission side, and the transmission side outputs a signal with a frequency different from the frequency of the received signal.

* * * * *